United States Patent
Suzuki et al.

[15] 3,666,709
[45] May 30, 1972

[54] SOLVENT SOLUBLE AROMATIC POLYMIDES AND PRODUCTION THEREOF

[72] Inventors: Munehiko Suzuki; Etsuo Hosokawa, both of Yokohama-shi; Misao Waki, Kawasaki-shi; Masatada Fukushima, Yokohama-shi, all of Japan

[73] Assignee: Shawa Densen Denran Kabushiki Kaisha a/k/a Showa Electric Wire & Cable Co., Ltd., Kanagawa-ken, Japan

[22] Filed: Dec. 15, 1969

[21] Appl. No.: 885,140

[30] Foreign Application Priority Data

Dec. 14, 1968 Japan........................43/91760

[52] U.S. Cl.................260/33.4 P, 260/47 CZ, 260/78 TF
[51] Int. Cl. ........................C08g 20/00, C08g 5/44
[58] Field of Search..............260/78 TF, 47 CZ, 33.4 P

[56] References Cited

UNITED STATES PATENTS

| | | | |
|---|---|---|---|
| 3,277,043 | 10/1966 | Holub | 260/33.4 |
| 3,345,342 | 10/1967 | Angelo | 260/78 |
| 3,493,540 | 2/1970 | Muller | 260/47 |
| 3,501,443 | 3/1970 | DiLeone | 260/78 |
| 3,505,168 | 4/1970 | Dunphy | 161/227 |
| 3,533,997 | 10/1970 | Angelo | 260/47 |

*Primary Examiner*—Morris Liebman
*Assistant Examiner*—Richard Zahlen
*Attorney*—Holman & Stern

[57] ABSTRACT

An aromatic tetracarboxylic acid which is representable by the general formula

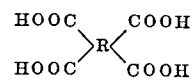

and contains at least 30 mol percent of

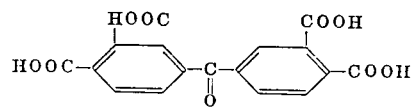

and a diamine which is representable by the general formula $H_2N-R'-NH_2$ and contains at least 30 mol percent of diamines representable by any of

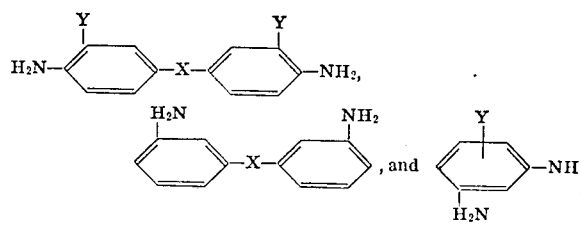

are heated and caused to react in substantially equal mol quantities in a phenolic solvent or in an aprotic organic polar solvent thereby to produce a new linear aromatic polyimide which is soluble in organic solvents and has high stability for preservation in the form of solutions such as varnishes. This method does not require a step of thoroughly dehydrating the aromatic tetracarbosylic acid component prior to the reaction.

31 Claims, 9 Drawing Figures

INVENTORS
M. SUZUKI ET AL
BY
ATTORNEYS

SOLVENT SOLUBLE AROMATIC POLYIMIDES AND PRODUCTION THEREOF

BACKGROUND OF THE INVENTION

This invention relates generally to polyimides and more particularly to new linear aromatic polyimides which are soluble in organic solvents and, moreover have excellent stability when preserved as varnishes.

As synthetic resins capable of forming coating films having heat resistance, polyamide acids prepared by causing an aromatic tetracarboxylic acid dianhydride and an aromatic diamine to undergo addition reaction in an aprotic organic polar solvent at a temperature below 50° C., preferably below 20° C. have been known.

By applying such a polyamide acid in the form of a solution on an article such as an electrical conductor and heating the same, the solvent is evaporated off, and, at the same time, the solute is dehydrated and condensed to become a polyimide, whereby a coating film of excellent heat resistance is formed.

While polyamide acids have such an advantage, they are extremely unstable and are gradually converted into insoluble polyimides even at room temperature, and a solution thereof thereby gels. For this reason, it is necessary to preserve these polyamide acids by refrigeration and to use, as the reaction solvent, an expensive aprotic organic polar solvent. Consequently, varnishes prepared from these polyamide acids become disadvantageously expensive.

By this reaction, furthermore, polymers of a high degree of polymerization can be obtained only in the case wherein the aromatic diamine is dissolved beforehand in the polar solvent, and the aromatic tetracarboxylic acid dianhydride is added gradually to this solution to cause reaction. When the addition sequence is reversed, or when the aromatic tetracarboxylic acid dianhydride is added as a solution, a polymer of a low degree of polymerization is formed, whereby the reaction operation becomes complicated. (References: J. Polymer Sci., 1 (10) 3135–3150 ('63), and J. App. Polymer Sci., 11, 609–727 ('67).)

By this known reaction method, moreover, when a tetracarboxylic acid is used in place of the tetracarboxylic acid dianhydride, the reaction does not progress. For this reason, it is necessary to heat and dry the tetracarboxylic acid dianhydride for a long time prior to the reaction, which procedure is another difficulty accompanying this method.

In addition, U.S. Pat. Nos. 2,710,853, 2,731,447 and 2,900,369 disclose processes wherein an aromatic tetracarboxylic acid and an aliphatic diamine are caused to undergo thermal reaction thereby to produce polyimides. These known aliphatic polyimides, however, are deficient in heat resistance and, moreover, have very low solubility in organic solvents, whereby it is not possible to use these polyimides as ingredients of varnishes.

A previous invention provides a process for producing curable liquid coating compositions in which carbonyl diphthalic acid anhydride and a diamine selected from the group consisting of diamines representable by the general formula (wherein, R designates a divalent radical selected from the group consisting of $C_{1-3}$ alkylene, are heated in a phenolic solvent at a temperature below 160° C. (as disclosed in U.S. Pat. No. 3,277,043, granted Oct. 4, 1966 to Fred Holub).

The compositions obtained by this method, however, are polyamide acids, and the polyimides obtained by dehydrating these polyamide acids are insoluble. When carbonyl diphthalic acid is used as a starting material, the reaction proceeds with difficulty, whereby the necessity of a process step for fully dehydrating the carbonyl diphthalic acid anhydride prior to the reaction presents a problem.

In view of these various problems, we have carried out research thereon, whereupon we have made certain discoveries, as described hereinafter, which we have utilized in providing the polyimides and a method of producing the same according to the invention.

SUMMARY OF THE INVENTION

It is an object of the present invention to utilize the findings we have made to provide aromatic polyimides and a method of producing the same which are not accompanied by the above described difficulties.

More specifically, an object of he present invention is to provide linear aromatic polyimides which the soluble in organic solvents and, accordingly, have preservation stability when rendered into a solution.

Another object of the invention is to provide a method of producing linear aromatic polyimides which does not require a process step of thoroughly dehydrating the aromatic tetracarboxylic acid component used prior to the reaction for producing the polyimides.

As a result of our study, we have found that the above stated objects and other objects as will presently become apparent can be achieved by causing an aromatic tetracarboxylic acid which is representable by the general formula and contains at least 30 mol percent of and a diamine which is representable by the general formula $H_2N-R'-NH_2$ and contains at least 30 mol percent of one or more kinds of diamines representable by any of to react in substantially equal mol quantities in a phenolic solvent or in an aprotic organic polar solvent thereby to produce a linear aromatic polyimide of the above described desirable character.

The nature, details, and utility of the invention will be more clearly apparent from the following detailed description beginning with general considerations and concluding with specific example of practice constituting preferred embodiments of the invention.

DETAILED DESCRIPTION

A linear aromatic polyimide of the invention comprises one or more kinds of units representable by the general formula in at least 30 percent of which R is and, moreover, in at least 30 percent of which R' is one or more members selected from those representable by the general formulas and is soluble in a concentration of at least 10 percent by weight in an organic solvent selected from among aprotic organic polar solvents and phenolic solvents, the polyimide, moreover, having a inherent viscosity (30° C., 0.5 g./100 ml. m-cresol, this definition being the same hereinafter) above 0.05.

Examples of desirable forms of R other than that set forth above are as follows.

Examples of desirable forms of R' other than those representable by the above set forth three general formulas are as follows.

Examples of phenolic solvents suitable for use according to the invention are phenol, various cresols such as o-, m-, and p-cresol, various xylenols such as 2,3-xylenol, 2,4-xylenol, 2,5-xylenol, 2,6-xylenol, 3,4-xylenol, and 3,5-xylenol, and halogenated derivatives thereof such as mono-, di-, tri-, tetra-, and penta-halophenols, mono-, di-, tri-, and tetra-halocresols, mono-, di-, and tri-xylenol, examples of the halogens being Cl, Br, and I.

While, of the halogenated derivatives those which are in liquid state at room temperature are preferable, it is possible to use even those which are solids at room temperature by dissolving them in small quantities of aromatic hydrocarbons such as toluene and xylene and using the resulting solutions as solvents. However, since the reaction solvent, in general, is ultimately evaporated off, and halogenated phenol is ordinarily of higher price than non-halogenated phenol, it is preferable to use a non-halogenated phenol such as a phenol, cresol, or xylenol.

Example of aprotic organic polar solvents suitable for use in the practice of the invention are N-methyl-2-pyrrolidone (NMP), N,N-dimethyl formamide (DMF), N,N-dimethyl acetamide (DMAc), N,N-diethyl formamide (DEF), N-methyl formamide (NMF), dimethyl sulfoxide (DMSO), N,N-diethyl acetamide (DEAc), N,N-dimethyl methoxyacetamide (DMOA), hexamethyl phosphoramide (HMPA), dimethyl sulfone (DMS), tetramethylene sulfone (TMS), and dimethyl tetramethylene sulfone (DMTMS).

In the case where a phenolic solvent is used, it is possible to use up to 20 to 30 percent of a non-solvent such as solvent naphtha, toluene, or xylene as a diluent after the process reaction.

A linear aromatic polyimide of the invention is produced as a clear solution, in general, by heating at a temperature of the order of from 100° to 240° C. one or more aromatic tetracarboxylic acids which are selected from tetracarboxylic acids representable by the general formula and in which the radicals R of at least 30 percent of the tetracarboxylic acids are and one or more aromatic diamines which are selected from aromatic diamines representable by the general formula $H_2N$ — R' — $HN_2$, and in which the radicals R' of at least 30 percent of the diamines are selected from among the forms in substantially equal mol quantities together with an organic solvent selected from phenolic solvents and aprotic organic polar solvents, the heating being continued for a time sufficient to cause imide ring closure reaction.

The ratio of the radicals respectively within R and R' of the linear aromatic polyimide produced by the above described reaction can be controlled by adjusting the mixture ratio of the aromatic tetracarboxylic acid and the one or more aromatic diamines used as starting materials. We have found that, while the mixture mol ratio of the tetracarboxylic acid and the diamine or diamines is preferably one (unity), if it is within a range of from 0.9 to 1.1, an aromatic polyimide of sufficiently high molecular weight can be produced.

Furthermore, while the sequence in which the reactants are added is not subject to any restriction, the simultaneous use of a phenolic solvent and an aprotic organic polar solvent is not desirable.

The linear aromatic polimide solution obtained by this reaction may very somewhat in character depending on the kinds of solvent and starting materials used and the mixture proportions.

More specifically, when an organic polar solvent is used as the reaction solvent or one diamine or both diamines representable by from among the aforementioned three kinds of diamines is or are used, a clear polyimide solution is obtained in either case. However, in the case where a phenolic solvent is used as the reaction solvent, and only a diamine representable by from among the aforementioned three kinds of diamines is used, an opaque polyimide solution is obtained when the quantity of this diamine of from 30 to 60 mol percent with respect to the total quantity of aromatic diamines in the starting materials, and, at the same time, the quantity of the portion is of the order of from 30 to 55 mol percent of the total quantity of the aromatic tetracarboxylic acid.

However, this problem can be solved by increasing the proportion of the portion within the aromatic tetracarboxylic acid or by additionally using another diamine from among the above mentioned three aromatic diamines.

The reaction is carried out by two stages of dehydration and condensation as follows.

Since the product of the above indicated reaction is a polyimide, this solution, differing from known products such as polyamide acids, is not accompanied by difficulties such as formation of water to produce foam or pinholes at the time of baking when used as a varnish.

We have found that when a small quantity of a catalyst such as a lower tetra-alkyl titanate, for example, tetrabutyl titanate or tetrapropyl titanate, is added to the solution during or after the reaction, the evaporation of the solvent at the time of baking of the varnish is promoted, and a baked coating film of excellent surface state can be obtained.

Since, in accordance with the invention, the reaction is carried out at a high temperature, a tetracarboxylic acid, itself, can be used, and therefore there is no necessity whatsoever for a process step for drying the reactants prior to the reaction. However, this does not mean that a tetracarboxylic acid dianhydride cannot be used, it being possible, of course, to use dianhydrides of tetracarboxylic acids and lower alkylesters in a similar manner.

Examples of compound components of aromatic tetracarboxylic acid suitable for use in the practice of the invention are 3,3',4,4'-benzophenonetetracarboxylic acid, pyromellitic acid, 3,3',4,4'-diphenyltetracarboxylic acid, 2,2',3,3'-diphenyltetracarboxylic acid, 2,3,6,7-naphthalenetetracarboxylic acid, bis (3,4-dicarboxyphenyl) ether, bis(3,4-dicarboxyphenyl) sulfide, bis(3,4-dicarboxyphenyl) sulfone, bis(3,4-dicarboxyphenyl) methane, bis(3,4-dicarboxyphenyl) propane, and anhydrides and lower alkylesters such as methyesters and ethylesters of these tetracarboxylic acids.

Examples of aromatic diamines representable by the three general formulas set forth hereinbefore are 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diamino diphenylmethane, 3,3'-dichloro-4,4'4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4-diaminodiphenylether, 3,3'-dibromo-4,4'-diamino diphenylether, 3,3'-dicarboxy4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3' -dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'- diaminobenzophenone, 3,3'-disulpho-4,4'-diaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid.

Examples of other aromatic diamines suitable for use in addition to the above set forth diamines are benzidine, 3,3'-diaminodiphenyl, m-phenylenediamine, p-phenylenediamine, 4,4'-diaminodiphenylmethane, 4,4'-diaminodiphenylether, 4,4'-diaminodiphenylsulfide, 4,4'-diaminodiphenylsulfone, 4,4'-diaminodiphenylpropane, 3,3'-dimethylbenzidine, 3,3'-dimethoxybenzidine, 3,3'-dichlorobenzidine, 3,3'-dibromobenzidine, 3,3'-dicarboxybenzidine, 3,3'-dihydroxybenzidine, and 3,3'-disulfobenzidine.

In the case where R consists of only and, moreover, R' consists of only a member selected from the afore-mentioned three general formulas, the linear aromatic polyimide of the invention has the optimum solubility with respect to an organic solvent. As the other ingredients increase this solubility progressively decreases. On the other hand, when the proportion of the tetracarboxylic acid with R representable by increases, or when the proportion of those in which R' is selected from the aforementioned three general formulas increases, the flexibility of the resulting resin ordinarily decreases.

Accordingly, to produce linear aromatic polyimides having both excellent solubility with respect to solvents and excellent flexibility, the respective proportions of the materials corresponding to R and R' are suitably adjusted.

While the solubility of the polyimides of the present invention is higher in organic polar solvents of the aprotic class, in general, than in phenolic solvents, such organic polar solvents are considerably more expensive than phenolic solvents and, moreover, are toxic to humans.

We have found that in the case where or a combination thereof is used for R' in the practice of the invention, a phenolic solvent can be used in the same manner as an aprotic, organic polar solvent. In the case where only is used for R', and a phenolic solvent is used as the reaction solvent, however, it is desirable that at least 55 percent of the radical R be representable by and at least 55 percent of the radical R' be representable by In the case wherein these radicals are from 30 to 40 percent of R or R', linear aromatic polyimides of relatively low solubilities are obtained.

We have found further that, in order to obtain polyimides suitable for use in varnishes for production of so-called magnet wires, that is, linear aromatic polyimides having viscosities of from 40 to 100 poises at room temperature in the form of solutions in a phenolic solvent of a resin content of 20 percent, it is desirable that at least 55 mol percent of the R in either of the above stated cases be Furthermore, when R is composed of from 55 to 65 percent of and from 45 to 35 percent of polyimides of excellent flexibility and heat softening characteristic are produced. In this case it is desirable for high solubility that at least 50 percent of R' be selected from among the afore-mentioned three general formulas.

Particularly in this case, when at least 50 percent of R' is caused to be and, at the same time, 50 percent or less of the remainder is selected from and maximum solubility is obtained, and an inexpensive non-solvent such as toluene or xylene can be used as a diluent up to a maximum limit, that is, approximately 30 percent. Moreover, a very tough film can be formed from the resin thus produced. In all cases where R' is the functional groups such as COOH or OH among the molecules can be connected by means of links such as diisocyanates to produce a cross-linked structure.

While the linear aromatic polyimide of the invention can be isolated by adding a large quantity of a non-solvent to the resin solution which is obtained as the reaction product, it is also possible when necessary to use the resin solution directly as a varnish by adding a modifier thereto.

In cases where the requirement for heat resistance is not very important, a portion of the aromatic diamine constituting a starting material can be substituted by an aliphatic diamine thereby to introduce an aliphatic radical into a portion of R'. Introduction of an aliphatic radical, in general, increases the flexibility of the polyimide.

Examples of suitable modifiers are diisocyanates, stabilized isocyanates, and soluble polyester resins.

An isolated polyimide of the invention can be dissolved, if necessary, in a solvent and used thus as a varnish or it can also be used directly as a stabilizer for rubbers, synthetic resins, etc., as a filler in ceramics, and as a resin material for pressure molding.

The utility and advantageous features of the present invention as indicated above may be summarized as follows.

1. The linear aromatic polyimides of the invention are dissolved in the imide state in a solvent and, therefore, does not need to be refrigerated for preservation as a varnish. (In contrast, a so-called polyimide varnish of known type is a solution of a polyamide acid in a solvent and is gradually converted into an insoluble polyimide to precipitate unless it is preserved under refrigeration.)

2. A varnish in which a polyimide of the invention is used can be applied to form a clean coating film free of defects. (In contrast, when known polyimide varnishes are baked, foam or pinholes due to water from the polyamide acid tend to be formed in the resulting coating film.)

3. In accordance with the invention, it is not necessary to dehydrate thoroughly the tetracarboxylic acid dianhydride prior to the reaction as in known methods.

4. By the method of the invention, the reaction can be controlled in a relatively simple manner since a polymer of high degree of polymerization can be obtained irrespective of the order or method of addition of the starting materials.

5. By the practice of the invention polyimide varnishes of low price can be produced, and there is little risk of operators in the manufacture thereof being poisoned because almost all of the polyimides according to the invention are soluble in non-toxic and inexpensive phenolic solvents.

In order to indicate still more fully the nature and utility of the invention, the following examples of practice constituting preferred embodiments of the invention, the results thereof, and reference examples are set forth, it being understood that these examples are presented as illustrative only and that they are not intended to limit the scope of the invention.

EXAMPLE 1

A three-neck flask provided with a thermometer, an agitator, and a condenser was charged simultaneously with 32.2 grams (g.) (0.1 mol) of 3,3',4,4'-benzophenonetetracarboxylic acid dianhydride, 22.8g. (0.1 mol) of 3,3'-dimethyl-4,4'-diaminodiphenylmethane, and 145 g. of m-cresol. The batch thus charged was heated, as it was agitated, from room temperature to 160° C., whereupon water began to be produced gradually from within the reaction system, and the solution progressively became clear.

The heating and agitation process was continued for approximately one hour, and the reaction was stopped after the distillation of water stopped (distillate quantity 3.5 g.). To the resin solution thus obtained, acetone was gradually added to cause the resin content to precipitate. The precipitated resin was then washed and vacuum dried at room temperature, whereupon a polyimide resin of light yellow color was obtained in a quantity of 48.8 g. (95 percent yield).

Figure 1:
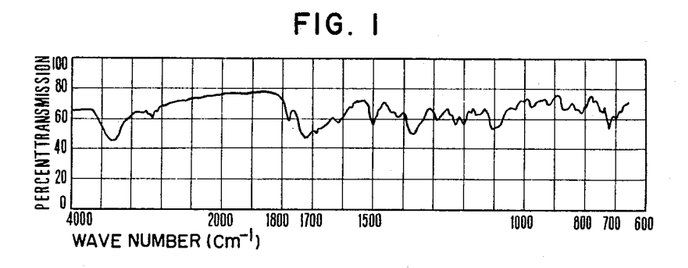
FIGS. 1 through 9, inclusive, are infrared analysis charts of linear aromatic polyimides of the invention.

This resin did not melt at 300° C., and the inherent viscosity thereof in m-cresol with a 0.5-percent concentration was 0.72. The infrared analysis chart of this resin is shown in FIG. 1, in which conspicuous absorptions are observable in the vicinity of 1,780, 1,730, and 730 cm$^{-1}$, which are the characteristic absorption bands of imides.

The ultimate analysis (elementary analysis) of the resin as $C_{32}H_{20}O_5N_2$ (in percent) was, as theoretical values, 74.8 C, 4.2 H, and 5.4 N, and was, as measured, 73.6 C, 3.4 H, and 5.1 N.

Inherent viscosities as herein set forth were calculated from the following equation.

$$\text{Inherent viscosity} = \frac{\log_e \frac{\text{solution viscosity}}{\text{solvent viscosity}}}{C}$$

wherein $C$ is the polymer concentration expressed in number of grams per 100 ml. of the solution, and the solution viscosity is the measured value of a 0.5-percent solution in m-cresol at 30° C.

The m-cresol used had the following composition.

|  | % by weight |
| --- | --- |
| p - cresol | 40.0 |
| m - cresol | 53.7 |
| 0 - cresol | 2.5 |
| phenol | 3.8 |

The infrared analysis was carried out by the KBr wafer. The absorption indicated in the vicinity of 3,400 cm$^{-1}$ in the infrared chart of FIG. 1 is due to the moisture content of the KBr.

EXAMPLE 2

The procedure set forth in Example 1 was carried out with the same starting materials as specified therein and with DMAc as the reaction solvent, whereupon an aromatic polyimide in the form of a solution was produced and found to have characteristics similar to those of the product of Example 1.

EXAMPLE 3

A procedure similar to that of Example 1 was carried out with the following starting materials and solvent thereby to produce a linear aromatic polyimide.

| | | |
| --- | --- | --- |
| 3,3',4,4'-benzophenone tetracarboxylic acid | | 35.8 g. (0.1 mol) |
| 3,3'-dichloro-4,4'-diaminodiphenylmethane | | 26.9 g (0.1 mol) |
| Xylenol for industrial use | | 150 g. |
| m-, p-cresol | 27.9 % | |
| 2,4-, 2,5-xylenol | 33.1 % | |
| p-ethylphenol, 3,5-xylenol | 31.6 % | |
| Others | 7.3 % | |
| Reaction conditions | | 170°C × 2 hours |
| Quantity of water distilled | | 7.0 g. |

The yield and characteristic of the linear aromatic polyimide thus produced were as follows.

Figure 2:
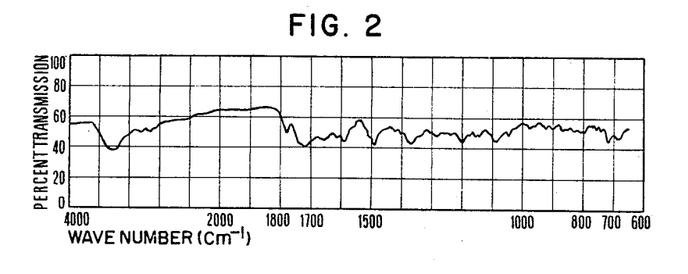

| | |
| --- | --- |
| Yield | 95.5 % |
| Color | light yellow |
| Melting | above 300°C |
| Infrared analysis | (chart, FIG. 2 |
| Solution | clear |
| Ultimate analysis as $C_{30}H_{14}N_2O_5Cl_2$ | |
| Theoretical (%): | 65.4 C, 2.5 H, 5.0 N. |
| Measured (%) | 64.6 C, 2.0 H, 4.8 N. |

EXAMPLE 4

A procedure similar to that of Example 1 was carried with the following starting materials and solvent thereby to produce a linear aromatic polyimide.

| | |
| --- | --- |
| 3,3'-4,4'-benzophenone tetracarboxylic acid dianhydride | 32.2 g. (0.1 mol) |
| 3,3'-diaminodiphenylsulfone | 24.8 g. (0.1 mol) |
| m-cresol | 150 g. |
| Reaction conditions | 160°C × 4 hours |
| Quantity of water distilled | 3.4 g. |

The yield and characteristics of the linear aromatic polyimide thus produced were as follows.

Figure 3:
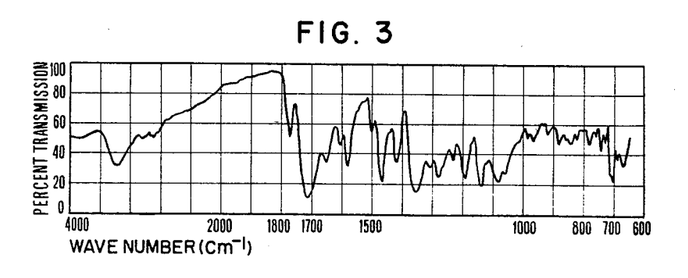

| | |
|---|---|
| Yield | 95.5 % |
| Color | Light yellow |
| Melting point | above 300°C |
| Infrared analysis | (chart, FIG. 3) |
| Solution | clear |
| Ultimate analysis as $C_{29}H_{14}O_7N_2S$ | |
| Theoretical (%): | 65.2C, 2.6H, 5.2 N. |
| Measured (%): | 64.8C, 2.2H, 5.2 N. |

EXAMPLES 5, 6, 7, 8, AND 9

Linear aromatic polyimides were produced respectively by procedures similar to that of Example 1 and with the starting materials, solvents, and reaction conditions as set forth in Table 1. The yields and characteristics of the resulting polyimide resins are also indicated in the same Table 1.

TABLE 1

Figure 4:
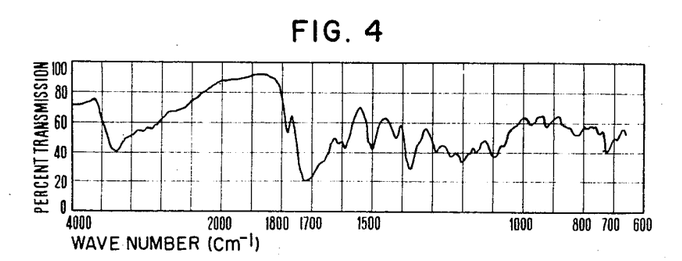

| Example | 5 | 6 | 7 | 8 | 9 |
|---|---|---|---|---|---|
| Starting material (mol): | | | | | |
| 3,3',4,4'-benzophenone tetracarboxylic acid | 0.1 | 0.1 | 0.1 | 0.1 | 0.1 |
| 3,3'-dimethoxy-4,4'-diaminodiphenylpropane | 0.1 | | | | |
| 3,3'-dicarboxy-4,4'-diaminodiphenylmethane | | 0.1 | | | |
| 3,3'-dihydroxy-4,4'-diaminodiphenylether | | | 0.1 | | |
| 3,3'-diethoxy-4,4'-diaminodiphenylsulfide | | | | 0.1 | |
| 3,3'-disulfo-4,4'-diaminodiphenylmethane | | | | | 0.1 |
| Solvent (g.): | | | | | |
| Xylenol for industrial use | 150 | 150 | 150 | | |
| NMP | | | | 150 | |
| DMF | | | | | 150 |
| Reaction conditions: | | | | | |
| Reaction temperature (° C) | 160 | 150 | 170 | 170 | 160 |
| Reaction time (hr.) | 3 | 3 | 1 | 2 | 3 |
| Resin product characteristics: | | | | | |
| Yield (percent) | 95 | 96 | 95 | 96 | 96 |
| Melting point (° C.) | ¹300 | ¹300 | ¹300 | ¹300 | ¹300 |
| Inherent viscosity | 0.80 | 0.82 | 0.75 | 1.10 | 0.91 |
| Colour | (²) | (²) | (²) | (²) | (²) |
| Infrared analysis chart | | (³) | | | |

¹ Above.
² Light yellow.
³ FIG. 4.
Quantity of water distilled: 6.9 g.
Ultimate analysis as $C_{32}H_{18}N_2O_9$.
Theoretical (percent): 67.1 C, 2.8H, 4.9 N.
Measured (percent): 66.7 C, 2.6H, 4.5 N.

EXAMPLE 10

A procedure similar to that specified in Example 1 was carried out with the following starting materials and solvent thereby to produce a linear aromatic polyimide solution.

| | |
|---|---|
| 3,3',4,4'-benzophenone tetracarboxylic acid dianhydride | 322 g. (1 mol) |
| 3,3'-dimethyl-4,4'-diaminodiphenylmethane | 137 g. (0.6 mol) |
| 4,4'-diaminodiphenylether | 80 g. (0.4 mol) |
| Xylenol for industrial use | 1,500 g. |
| Reaction conditions | 170°C × 2 hrs. |

To the polyimide solution thus obtained, the reaction solvent and a small quantity of petroleum naphtha were added to prepare an enamel varnish of 20-percent resin content.

This varnish was applied directly onto an annealed copper wire of 1.0-mm. diameter and baked at a temperature of 400° C. at a baking speed of 8 meters/minute, whereupon a magnet wire of a coating film thickness of 0.047 mm. was obtained. The characteristics of this magnet wire were as follows.

| | |
|---|---|
| Pinholes (Number/5m) | 0 |
| Flexibility (minimum wrap-around diameter) | 1 × diam. good |
| Abrasion, Repeating Scrape (700 g. load) | 60 cycles |
| Cut-through temperature (single-point crossing, 700 g. load) | above 300°C |
| Heat shock (300°C × 1 hr.) | 1 × diam., good |
| Breakdown voltage (Normal state) | 16.8 KV. |
| (After 24-hr. immersion in water) | 16.5 KV. |
| (After heating, 200°C × 2 hrs.) | 16.5 KV. |
| Freon 22 resistance | good |

EXAMPLES 11, 12, 13, 14, AND 15

By a procedure similar to that of Example 1 and with the use of the starting materials set forth in Table 2, polyimide solutions were respectively produced. The polyimides were isolated from a portion of these solutions and subjected to infrared analysis, whereupon conspicuous absorptions were observed in all cases in the vicinity of 1,780, 1,730, and 730 $cm^{-1}$, which are the characteristic absorption bands of imides.

TABLE 2

| Example | 11 | 12 | 13 | 14 | 15 |
|---|---|---|---|---|---|
| Starting material (mol): | | | | | |
| 3,3',4,4-benzophenonetetracarboxylic acid dianhydride | 1 | 1 | 1 | 1 | 1 |
| 3,3'-diethyl-4,4'-diaminodiphenylsulfone | 0.7 | | | | |
| 3,3'-dimethoxy-4,4'-diaminodiphenylether | | 0.6 | | | |
| 3,3'-dicarboxy-4,4'-diaminodiphenylsulfide | | | | 0.7 | 0.5 |
| 3,3'-dihydroxy-4,4-diaminodiphenylpropane | | | 0.8 | | |
| 3,3'-diaminodiphenylpropane | | | | 0.2 | |
| 3,3'-diaminodiphenylmethane | | | | | 0.2 |
| 4,4'-diaminodiphenylmethane | | 0.3 | | | |
| 4,4'-diaminodiphenylether | | | 0.4 | | 0.1 |
| Benzidine | | | | 0.2 | |
| 1,5-diaminonaphthalene | | | | | 0.1 |

These solutions were then adjusted to a resin content of 20 percent and were respectively applied directly as coating on annealed copper wire of 1.0 mm. diameter and baked similarly as in Example 10, whereupon magnet wires of a coating film thickness of 0.047 mm. were obtained. The characteristics of the magnet wires thus produced are set forth in Table 3.

TABLE 3

| Example | 11 | 12 | 13 | 14 | 15 |
|---|---|---|---|---|---|
| Test: | | | | | |
| Pinholes (number/5 m.) | 0 | 0 | 0 | 0 | 0 |
| Flexibility (wrap around own diameter) (good, poor) | Good | Good | Good | Good | Good |
| Abrasion, repeated scrape (700 g. load) (cycles) | 144 | 156 | 138 | 160 | 168 |
| Cut-through temperature (single-point crossing,, 700 g. load) (° C.) | >300 | >500 | >300 | >300 | >300 |
| Heat shock (300° C.×2 hrs.) | (1) | (1) | (1) | (1) | (1) |
| Breakdown voltage (KV): | | | | | |
| Normal state | 16.7 | 16.5 | 16.9 | 16.7 | 16.4 |
| After 24-hr. immersion in water | 16.4 | 16.3 | 16.7 | 16.7 | 16.2 |
| After heating, 200° C.×2 hrs | 16.5 | 16.3 | 16.5 | 16.5 | 16.3 |
| Freon 22 resistance | Good | Good | Good | Good | Good |

1X diameter, good.

EXAMPLE 16, 17, 18, 19, 20, AND 21

The procedure of Example 1 was carried out with the use of the starting materials set forth in Table 4 to produce respective polyimide solutions. After adjustment to a resin content of 20 percent, these solutions were applied directly as coating an annealed copper wire of 1.0 mm. diameter and baked similarly as in Example 10, whereupon magnet wires of coating film thickness of from 0.047 to 0.048 mm. were obtained. The characteristics of these magnet wires are indicated in Table 5.

TABLE 4

| Example | 16 | 17 | 18 | 19 | 20 | 21 |
|---|---|---|---|---|---|---|
| Starting material (mol): | | | | | | |
| 3,3',4,4'-benzophenone tetracarboxylic acid dianhydride | 0.7 | 0.8 | 0.7 | 0.7 | 0.8 | 0.8 |
| Pyromellitic acid dianhydride | 0.3 | | 0.3 | | | 0.1 |
| 3,3',4,4'-diphenyl tetracarboxylic acid | | | | 0.2 | | 0.1 |
| 2,3,6,7-naphthalene tetracarboxylic acid dianhydride | | | | | 0.1 | |
| 2,2-bis(3,4-dicarboxyphenyl) propane | | | | | 0.2 | |
| Bis (3,4-dicarboxyphenyl) ether | | | | | 0.2 | |
| 3,3'-dicargoxy-4,4'-diaminodiphenyl-methane | | 0.8 | | | 0.7 | |
| 3,3'-diaminodiphenylsulfide | | | 0.7 | | 0.1 | |
| 3,3-diaminodiphenylether | | | | | | 0.8 |
| 2,4-diaminotoluene | | | | 0.7 | | |
| 1-isopropyl-2,4-m-phenylenediamine | | | | 0.7 | | 0.1 |
| p-phenylenediamine | 0.2 | | | 0.1 | | |
| 4,4'-diaminodiphenylsulfone | | | 0.3 | | 0.2 | |
| 3,3'-dimethoxybenzidine | | | | 0.2 | | |
| 4,4'-diaminodiphenylpropane | | | | 0.3 | | 0.1 |
| Inherent viscosity | 0.81 | 0.91 | 0.95 | 1.01 | 1.10 | 0.92 |
| Quantity of water distilled, g | | | | 3.4 | | |

TABLE 5

Figure 5:
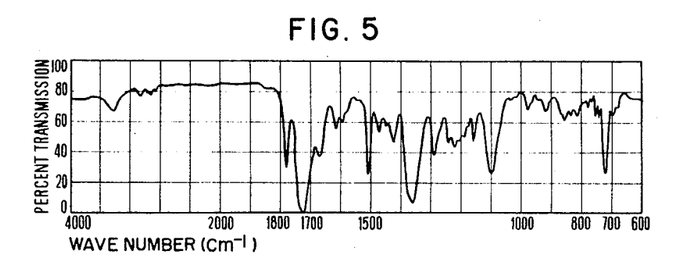

| Example | 16 | 17 | 18 | 19 | 20 | 21 |
|---|---|---|---|---|---|---|
| Test: | | | | | | |
| Pinholes (number/5 m.) | 0 | 0 | 0 | 0 | 0 | 0 |
| Flexibility (wrap around own diameter) (good, poor) | Good | Good | Good | Good | Good | Good |
| Abrasion, repeated scrape (700 g. load) (cycles) | 82 | 99 | 87 | 89 | 102 | 112 |
| Cut-through temperature (single-point crossing, 700 g. load) (° C.) | >300 | >300 | >300 | >300 | >300 | >300 |
| Heat shock, (300° C.×2 hrs.) | (1) | (1) | (1) | (1) | (1) | (1) |
| Breakdown voltage, (KV): | | | | | | |
| Normal state | 16.5 | 16.4 | 16.7 | 16.5 | 16.3 | 16.8 |
| After 24-hr. immersion in water | 16.1 | 16.2 | 16.4 | 16.4 | 16.0 | 16.6 |
| After heating, 200° C.×2 hrs | 16.0 | 16.0 | 16.5 | 16.1 | 16.0 | 16.5 |
| Freon 22 resistance | Good | Good | Good | Good | Good | Good |
| Infrared analysis chart | | | (2) | | | |

[1] 1×diameter, good.
[2] FIG. 5.

The polyimides were isolated from portions taken from the polyimide solutions obtained in the above described manner, and the characteristics of these isolated polyimides were measured. All of these resins had a light yellow color and melting points above 300° C. Furthermore, the infrared analysis chart of each polyimide exhibited conspicuous absorptions in the vicinity of 1,780, 1,730 and 730 cm$^{-1}$, which are the characteristic absorption bands of imides. The inherent viscosities of these resins were as indicated in Table 4.

EXAMPLE 22

The procedure of Example 1 was followed with the use of the following starting materials and solvent, whereupon a linear aromatic polyimide was obtained.

| | |
|---|---|
| 3,3',4,4'-benzophenone tetra carboxylic acid dianhydride | 322 g. (1 mol) |
| 3,3'-diaminodiphenylsulfone | 124 g. (0.5 mol) |
| 4,4'-diaminodiphenylether | 100 g. (0.5 mol) |
| m-cresol | 1,500 g. |
| Reaction conditions | 160° C × 1 hr. |
| Quantity of water distilled | 3.3 g. |

The yield and characteristics of the linear aromatic polyimide thus produced were as follows.

Figure 6:
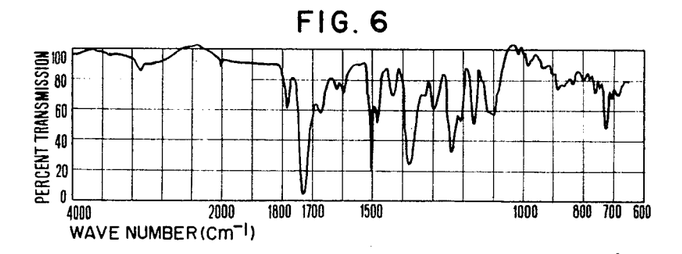

| | |
|---|---|
| Yield | 94.7 % |
| Solution | light yellow, clear |
| Infrared chart | (FIG 6) |

To this resin upon completion of the reaction, 2 g. of tetrabutyl titanate was added at room temperature, and the resulting mixture was agitated. The resulting varnish was applied as a coating directly on an annealed copper wire of 1.0 mm. diameter and baked under the conditions of a baking temperature of 350° C. and a baking speed of 8 meters/minute, whereupon a magnet wire of a coating film thickness of 0.045 mm. was obtained. The characteristics of this magnet wire were as follows.

| | |
|---|---|
| Pinholes (number/5m.) | (none) |
| Flexibility (minimum wrap-around diameter) | 1 × diam. |
| Abrasion, Repeated Scrape (700-g. load) (cycles) | 120 |
| Cut-through temperature (single-point crossing, 700-g. load) | over 300°C |
| Heat shock (300°C × 2 hrs.) | 1 × diam., good |
| Breakdown voltage | |
| (normal state) | 16.5 KV |
| (after 24-hr. immersion in water) | 16.0 KV |
| (after heating, 200°C × 2 hrs.) | 16.4 KV |
| Freon 22 resistance | good |

EXAMPLES 23, 24, 25, 26, 27, AND 28.

The procedure of Example 1 was carried out with the starting materials and solvents indicated in Table 6 thereby to produce linear aromatic polyimides, the characteristics of which are shown in the same Table 6.

TABLE 6

Figure 7:
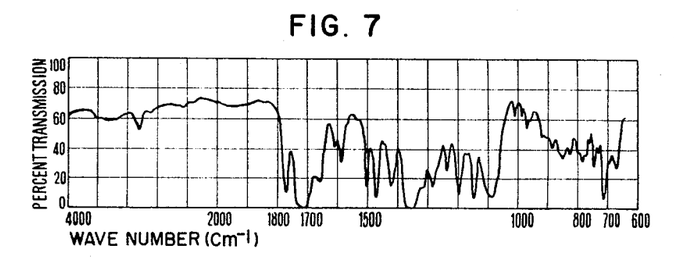

| Example | 23 | 24 | 25 | 26 | 27 | 28 |
|---|---|---|---|---|---|---|
| Starting material (mol): | | | | | | |
| 3,3',4,4'-benzophenone tetracarboxylic acid | 0.07 | 0.62 | 0.08 | 0.09 | 0.08 | 0.07 |
| Pyromellitic acid | 0.03 | | | | | |
| 3,3',4,4'-diphenyl tetracarboxylic acid | | 0.038 | | | 0.01 | 0.03 |
| 2,3,6,7-naphthalene tetracarboxylic acid | | | 0.02 | 0.01 | | |
| 2,2-bis(3,4-dicarboxyphenyl) propane | | | | | 0.01 | |
| 3,3'-diaminodiphenylsulfone | 0.055 | | | | | |
| 3,3'-diaminodiphenylmethane | | | 0.045 | | | 0.02 |
| 3,3'-diaminodipheylsulfide | | | | 0.03 | | |
| 2,4-diaminotoluene | | | | 0.035 | 0.045 | 0.02 |
| 4,4'-diaminodiphenylmethane | | 0.045 | | | | |
| Benzidine | | 0.055 | | | | |
| 1,5-diaminonaphthalene | | | 0.07 | | 0.055 | |
| 3,3'-dimethyl-4,4'-diaminodiphenylmethane | | | | 0.065 | | |
| Xylenol for industrial use (g.) | 150 | 150 | 150 | 150 | 150 | 150 |
| Reaction catalyst and quantity added (percent of resin content) | | [1] 0.05 | [2] 0.1 | | | |
| Reaction conditions (temp.×time) | [3] 170 | [3] 160 | [4] 170 | [4] 190 | [3] 180 | [3] 180 |
| Yield, (percent) | 96.0 | 96.2 | 95.2 | 94.4 | 93.8 | 94.0 |
| Inherent logarithmic viscosity | 0.92 | 0.72 | 0.75 | 0.70 | 0.710 | 0.70 |
| Infrared analysis chart | [5] | | | | | |
| Quantity of water distilled (g.) | 5.9 | | | | | |

[1] Lead naphthanate.
[2] γ-picoline.
[3] °C.×2 hrs.
[4] °C.×1 hr.
[5] FIG. 7.

EXAMPLE 29

With the use of the following starting materials and solvent, the procedure of Example 1 was carried out to produce a linear aromatic polyimide, to which a small quantity of petroleum naphtha was then added to prepare an enamel varnish of 20-percent resin content.

| | |
|---|---|
| 3,3',4,4'-benzophenone tetracarboxylic acid dianhydride | 0.55 mol |
| Pyromellitic acid dianhydride | 0.45 mol |
| 3,3'-diaminodiphenylsulphone | 0.40 mol |
| 4,4'-diaminodiphenylether | 0.60 mol |
| Xylenol for industrial use | 1,500 g. |
| Tetrabutyl titanate | 0.44 g. |
| | (0.1% of resin content) |
| Reaction conditions | 170°C × 1 hr. |
| Quantity of water distilled | 34.0 g. |

The enamel varnish thus prepares was applied as a coating on an annealed copper wire of 1.0 mm. diameter and baked in the same manner as described in Example 10 thereby to produce a magnet wire having the following characteristics, the results of a comparison example being also indicated.

| | Example 29 | Comparison Example |
|---|---|---|
| Pinholes (number/5 m.) | 0 | 0 |
| Flexibility (minimum wrap-around diameter) | 1 × diam. | 1 × diam. |
| Abrasion, Repeating Scrape cycles (700g. load) | 76 | 74 |
| Cut-through temperature (single-point crossing, 700g. load) | 300°C | 300°C |
| Heat shock (300°C × 2 hrs.) | 1 × diam. good | 1 × diam. good |
| Breakdown voltage (KV) | | |
| (Normal state) | 16.7 | 16.8 |
| (After 24-hrs. immersion in water) | 16.5 | 16.5 |
| (After heating, 200°C × 2 hrs.) | 16.4 | 16.4 |
| Aging test (250°C × 6 hrs. heating then wrapping) | 1 × diam. good | 3 × diam. good |
| Overload test (time for 20-mA leakage current to flow when 40-A current is passed through twist pair sample) | 30–50 min. | 10–15 min. |

Figure 8:
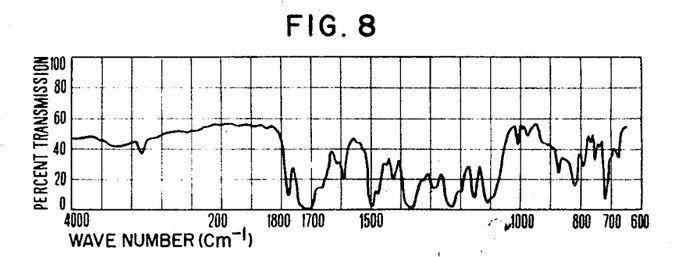

In the above mentioned comperison example, a polyimide was produced in the same manner as in Example 29 with equal mol quantities of 3,3',4,4'-benzophenone tetracarboxylic acid dianhydride and 3,3'-diaminodiphenylsulfone and applied as coating and baked on an electrical conductor under the same conditions as in Example 29 to produce a magnet wire. The inherent viscosity of the polyimide of this Example 29 was 0.78 and the infrared analysis chart is shown in FIG. 8.

EXAMPLES 30, 31, 32, AND 33

Linear aromatic polyimides were obtained similarly as described in Example 1 through the use of the starting materials and solvents indicated in Table 7. The yields and inherent viscosities of the polyimides thus obtained are also set forth in Table 7.

TABLE 7

| Example | 30 | 31 | 32 | 33 |
|---|---|---|---|---|
| Starting material (mol): | | | | |
| 3,3',4,4'-benzophenone tetracarboxylic acid dianhydride | 0.55 | | | 0.30 |
| 3,3',4,4'-benzophenone tetracarboxylic acid methylester | | 0.45 | 0.30 | |
| Bis (3,4-dicarboxydiphenyl) sulfone | 0.45 | | 0.70 | 0.30 |
| Bis (3,4-dicarboxyphenyl) ether | | 0.55 | | 0.40 |
| 3,3'-diaminodiphenylpropane | 0.45 | | | |
| 3,3'-diaminodiphenylsulfone | | 0.58 | | 0.58 |
| 2,6-diaminotoluene, 2,4-diaminotoluene, 20/80 | | | 0.5 | |
| 4,4'-diaminodiphenylpropane | 0.55 | | | |
| 4,4'-diaminodiphenylmethane | | 0.42 | | |
| 4,4'-diaminodiphenylether | | | 0.25 | 0.32 |
| 4,4'-diaminodiphenylsulfone | | | | 01 |
| m-Phenylenediamine | | | 0.25 | |
| Xylenol for industrial use (g.) | 1,500 | 1,500 | 1,500 | 1,500 |
| Reaction catalyst and quantity added (percent of resin content) | | [1] 0.0 | [1] 0.1 | |
| Reaction conditions (tem.×time) | [2] 190 | [3] 170 | [3] 170 | [3] 170 |
| Yield, (percent) | 93.0 | 95.0 | 95.5 | 96.0 |
| Inherent viscosity | 0.81 | 0.79 | 0.91 | 1.02 |

[1] Lead naphthanate.
[2] °C. × 2 hrs.
[3] °C. × 1 hr.

NOTE.—The 3,3',4,4'-benzophenone tetracarboxylic acid methylester is of an acid value of 287.4 (corresponding to dimethylester).

EXAMPLES 34, 35, 36, AND 37

With the use of the starting materials set forth in Table 8, polyimide solutions were obtain by a procedure similar to that of Example 1, and with these polyimide solutions, enamel varnishes of 20-percent resin content were prepared similarly as in Example 10.

TABLE 8

| Example | 34 | 35 | 36 | 37 |
|---|---|---|---|---|
| Starting material (mol): | | | | |
| 3,3',4,4'-benzophenone tetracarboxylic acid dianhydride | | 1 | | |
| 3,3',4,4'-benzophenone tetracarboxylic acid ethylester | 1 | | 1 | 1 |
| 3,3'-dimethyl-4,4'-diaminodiphenylmethane | | 0.7 | | |
| 3,3'-dimethoxy-4,4'-diaminodiphenylether | 0.3 | | | 0.5 |
| 3,3'-dicarboxy-4,4'-diaminodiphenylsulfide | | | 0.4 | |
| 3,3'-diaminodiphenylsulfone | | 0.1 | | |
| p-Xylenediamine, m-Xylenediamine, 30/70 | | 0.1 | | |
| 4,4'-diaminodiphenylmethane | | 0.1 | 0.3 | 0.5 |
| Benzidine | | | 0.3 | |
| 4,4'-diaminodiphenylether | 0.7 | | | |
| Quantity of water distilled (g.) | | 33.5 | | |

The enamel varnishes thus prepared were applied as coating and baked on soft copper wires of 1.0-mm. diameter. The magnet wires thus obtained had coating film thicknesses of from 0.047 to 0.048 mm. and characteristics as indicated in Table 9.

All polyimides of these examples had melting points above 300° C., and the inherent viscosities thereof were from 0.81 to 1.20 (0.5-percent concentration in DMAc, 30° C.).

TABLE 9

Figure 9:
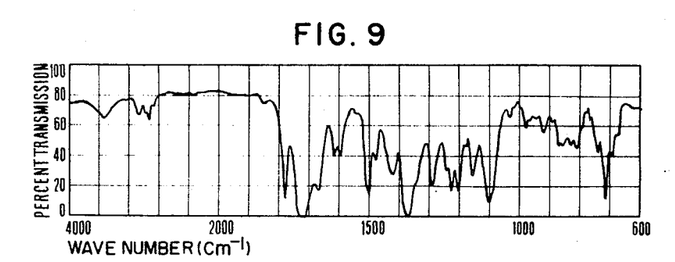

| Example | 33 | 35 | 36 | 37 |
|---|---|---|---|---|
| Test: | | | | |
| Pinholes (number/5 m.) | 0 | 0 | 0 | 0 |
| Wrap around own diameter (good/poor) | Good | Good | Good | Good |
| Abrasion repeating scrape 700 g. load (cycles) | 69 | 81 | 69 | 84 |
| Cut through temperature (single-point crossing, 700 g. load) (° C.) | >300 | >300 | >300 | >300 |
| Heat chock, 300° C.×2 hrs | (1) | (1) | (1) | (1) |
| Breakdown voltage, (KV): | | | | |
| Normal state | 16.4 | 16.4 | 16.4 | 16.5 |
| After 24-hrs. immersion in water | 16.2 | 16.6 | 16.2 | 16.3 |
| After heating 200° C.×2 hrs | 16.2 | 16.5 | 16.3 | 16.3 |
| Freon 22 resistance | Good | Good | Good | Good |
| Infrared analysis chart | | (2) | | |

[1] 1X diameter, good.
[2] FIG. 9.

EXAMPLES 38, 39, 40, 41, 42, AND 43

Linear aromatic polyimides were produced with the starting materials and solvents shown in Table 10 in a manner similar to that of Example 1. The results shown in the same Table 10.

EXAMPLE 44

A linear aromatic polyimide was produced with the following starting materials and solvent by a procedure similar to that of Example 1.

| | |
|---|---|
| 3,3',4,4'-benzophenone tetracarboxylic acid dianhydride | 32.2 g. (0.1 mol) |
| 3,3'-diaminobenzophenone | 21.2 g. (0.1 mol) |
| Xylenol for industrial use | 150 g. |
| Reaction conditions | 170°C × 1 hr. |

The yield and characteristics of the linear aromatic polyimide thus produced were as follows.

| | | |
|---|---|---|
| Yield | | 95 % |
| Quantity of water distilled | | 3.5 g. |
| Solution | light yellow, clear | |
| Melting point | above | 300°C |
| Inherent viscosity | | 0.86 |

Examples 45, 46, 47, 48, 49, 50, and 51.

TABLE 10

| Example | 38 | 39 | 40 | 41 | 42 | 43 |
|---|---|---|---|---|---|---|
| Starting material: | | | | | | |
| 3,3',4,4'-benzophenone tetracarboxylic acid | | 0.07 | 0.08 | | 0.07 | 0.1 |
| 3,3',4,4'-benzophenone tetracarboxylic acid | 0.1 | | | 0.06 | | |
| Pyromellitic acid | | 0.03 | | | | |
| 3,3',4,4'-diphenyl tetracarboxylic acid | | | | 0.02 | | |
| 2,3,6,7-naphthalene tetracarboxylic acid | | | | 0.04 | | |
| 2,2-bis (3,4-dicarboxyphenyl) propane | | | | | 0.03 | |
| 2,4-diaminoanisole | | 0.055 | | | | 0.02 |
| 2,4-diaminomonochlorobenzene | | | 0.04 | | | |
| 2,4-diaminobenzoic acid | | | | 0.05 | | |
| 2,4-diaminophenol | | | | | 0.03 | 0.02 |
| 2,4-diaminobenzenesulfonic acid | | | | | 0.45 | |
| 4,4'-diaminodiphenylether | 0.045 | | | | | |
| 4,4'-diaminodiphenylmethane | | 0.06 | | | | |
| Benzidine | | | 0.05 | | | |
| 4,4'-diaminodiphenylpropane | | | | 0.07 | | 0.06 |
| 1,5-diaminonaphthalene | | | | | 0.055 | |
| Xylenol for industrial use (g.) | | 150 | | 150 | 150 | 150 |
| m-Cresol (g.) | 150 | | 150 | | | |
| Reaction catalyst and quantity added (percent of resin content) | | [1] 0.05 | [2] 0.05 | [3] 0.1 | | |
| Reaction conditions (temp.×time) | [4] 160 | [4] 160 | [4] 170 | [4] 180 | [5] 170 | [5] 180 |
| Yield, (percent) | 94.8 | 95.0 | 95.2 | 93.7 | 96.1 | 94.0 |
| Inherent viscosity | 0.90 | 0.95 | 1.15 | 0.81 | 0.73 | 0.86 |

[1] Tetrabutyl titanate.
[2] Lead naphthanate.
[3] γ-picoline.
[4] C.×1 hr.
[5] C.×2 hrs.

With the starting materials and solvents indicated in Table 11, linear aromatic polyimides were produced by a procedure similar to that of Example 1. The yields and characteristics of the resulting polyimides are also set forth in Table 11.

TABLE 11

| Example | 45 | 46 | 47 | 48 | 49 | 50 | 51 |
|---|---|---|---|---|---|---|---|
| Starting material (mol): | | | | | | | |
| 3,3',4,4'-benzophenone tetracarboxylic acid dianhydride | 0.1 | 0.1 | 0.07 | 0.08 | 0.06 | | |
| 3,3',4,4'-benzophenone tetracarboxylic acid dimethylester | | | | | 0.02 | 0.08 | 0.07 |
| Pyromellitic acid dianhydride | | | 0.03 | | | 0.02 | |
| Bis(3,4-dicarboxyphenyl)ether | | | | 0.04 | | | 0.03 |
| 3,3'-dimethyl-4,4'-diaminobenzophenone | 0.1 | | | | | 0.045 | |
| 3,3'-dibromo-4,4'-diaminobenzophenone | | | 0.05 | | | | |
| 3,3'-dioxy-4,4'-diaminobenzophenone | | 0.1 | | | | | |
| 3,3'-dimethoxy-4,4'-diaminobenzophenone | | | | | | | |
| 3,3'-diaminobenzophenone | | | | | 0.06 | | |
| 4,4'-diaminodiphenylmethane | | | | 0.04 | | | 0.05 |
| 4,4'-diaminodiphenylether | | | | 0.05 | | | |
| 4,4'-diaminodiphenylpropane | | | | | 0.04 | | |
| 4,4'-diaminodiphenylsulfone | | | | | 0.06 | | |
| p-Phenylenediamine | | | | | | 0.055 | |
| Benzidine | | | | | | | 0.03 |
| Xylenol for industrial use (g.) | 150 | 150 | 150 | 150 | | | 0.02 |
| DMAc (g.) | | | | | 150 | | 150 |
| NMP (g.) | | | | | | 150 | |
| Reaction conditions (temp.×time) | ¹160 | ¹160 | ²170 | ²170 | ²180 | ¹160 | ²170 |
| Yield (percent) | 94.5 | 95.0 | 96.0 | 94.8 | 93.2 | 95.3 | 94.5 |
| Inherent viscosity | 0.78 | 0.86 | 0.75 | 0.91 | 0.71 | 0.70 | 0.89 |

¹ °C.×2 hrs.
² °C.×1 hr.

REFERENCE EXAMPLE

The following starting materials and solvent were caused to react at 125° C. for 3 hours to obtain a clear varnish, which was applied and baked on a copper plate. The resulting coating film of 20-micron thickness was bent through 180° of angle, whereupon cracks were formed therein. Furthermore, when this varnish was caused to react at 170° C. for 3 hours, the resin content thereof precipitated out.

| 3,3',4,4'-benzophenone tetracarboxylic acid dianhydride | 16.1 g. (0.05 mol) |
|---|---|
| 4,4'-diaminodiphenylether | 12.4 g. (0.05 mol) |
| m-cresol | 180 g. |

What we claim is:

1. A linear aromatic polyimide consisting of units of at least one kind representable by the general formula selected from the group consisting of:

and and R' is selected from the group consisting of:

at least 30 percent of the radicals R being representable by at least 30 percent of the radicals R' being of at least one kind selected from the group consisting of radicals representable by where X is a member selected from the group consisting of $$-CH_2-, -O-, -S-, -SO_2-, -\overset{CH_3}{\underset{CH_3}{C}}-, \text{ and } -\overset{O}{\underset{}{C}}-,$$

and Y is a member selected from the group consisting of lower alkyls, lower alkoxyls, halogens, COOH, OH and SO₃H, said polyimide being in the form of a clear solution of a concentration of more than 10 percent by weight thereof in a phenolic solvent and having an inherent viscosity of 30 degrees C, 0.5 g./100 ml. in m-cresol greater than 0.05.

2. A linear aromatic polyimide as claimed in claim 1 in which at least 30 percent of the radicals R' is selected from and said solvent is a phenolic solvent, in which the polyimide is dissolved to form a clear solution.

3. A linear aromatic polyimide as claimed in claim 1 in which at least 55 percent of the radicals R is at least 55 percent of the radicals R' is and said solvent is a phenolic solvent, in which the polyimide is dissolved to form a clear solution.

4. A linear aromatic polyimide as claimed in claim 2 in which at least 55 percent of the radicals R is

5. A linear aromatic polyimide as claimed in claim 2 in which from 55 to 65 percent of the radicals R is and from 45 to 35 percent of the radicals R is

6. A linear aromatic polyimide as claimed in claim 3 in which from 55 to 65 percent of the radicals R is and from 45 to 35 percent of the radicals R is 7. A linear aromatic polyimide as claimed in claim 1 in which the radicals R' are selected from those representable by

8. A linear aromatic polyimide as claimed in claim 5 in which from 55 to 65 percent of the radicals R is from 45 to 35 percent of the radicals is at least 50 percent of the radicals R' is and the remainder of the radicals R' is selected from radicals representable by

9. A linear aromatic polyimide as claimed in claim 1 which consists of recurring units each representable by

10. A linear aromatic polyimide as claimed in claim 1 which consists of recurring units each representable by

11. A linear aromatic polyimide as claimed in claim 1 which consists of recurring units each representable by

12. A linear aromatic polyimide as claimed in claim 1 which consists of recurring units each representable by

13. A linear aromatic polyimide as claimed in claim 2 in which the radicals R consists of radicals and the radicals R' consists of 50 percent of radicals and 50 percent of radicals

14. A method of producing a solution of a linear aromatic polyimide as defined in claim 1 which comprises the steps of dissolving substantially equal mol quantities of at least one compound selected from the group consisting of aromatic tetracarboxylic acid compound each representable by the general formula at least 30 percent of the radicals R being representable by and at least one diamine selected from the group consisting of aromatic diamines each representable by the general formula [H$_2$N — R — NH$_2$]H$_2$N — R' — NH$_2$, at least 30 percent of the radicals R' being selected from the group consisting of radicals representable by in a phenolic solvent and heating the resulting solution at a temperature above the boiling point of water for a time period sufficient for occurrence of imide ring closure reaction.

15. A method of producing a linear aromatic polyimide as claimed in claim 14 in which said at least one selected aromatic tetracarboxylic said compound is a dianhydride.

16. A method of producing a linear aromatic polyimide as claimed in claim 14 in which the aromatic diamine used does not contain any of OH, COOH, and SO$_3$H as a substituent.

17. A linear aromatic polymide as claimed in claim 1 wherein Y is selected from the group consisting of lower alkyls, lower alkoxyls, halogens, and —SO$_3$H.

18. A composition comprising a solution of an aromatic polyimide as claimed in claim 1 homogeneously dissolved in a phenolic solvent selected from the group consisting of phenol, cresol, xylenol and halogenated derivatives thereof, at a concentration of at least 10 percent by weight.

19. A composition comprising a solution of an aromatic polyimide as claimed in claim 2 homogeneously dissolved in a phenolic solvent selected from the group consisting of phenol, cresol, xylenol and halogenated derivatives thereof, at a concentration of at least 10 percent by weight.

20. A composition comprising a solution of an aromatic polyimide as claimed in claim 3 homogeneously dissolved in a phenolic solvent selected from the group consisting of phenol, cresol, xylenol and halogenated derivatives thereof, at a concentration of at least 10 percent by weight.

21. A composition comprising a solution of an aromatic polyimide as claimed in claim 4 homogeneously dissolved in a phenolic solvent selected from the group consisting of phenol, cresol, xylenol and halogenated derivatives thereof, at a concentration of at least 10 percent by weight.

22. A composition comprising a solution of an aromatic polyimide as claimed in claim 5 homogeneously dissolved in a phenolic solvent selected from the group consisting of phenol, cresol, xylenol and halogenated derivatives thereof, at a concentration of at least 10 percent by weight.

23. A composition comprising a solution of an aromatic polyimide as claimed in claim 6 homogeneously dissolved in a phenolic solvent selected from the group consisting of phenol, cresol, xylenol and halogenated derivatives thereof, at a concentration of at least 10 percent by weight.

24. A composition comprising a solution of an aromatic polyimide as claimed in claim 7 homogeneously dissolved in a phenolic solvent selected from the group consisting of phenol, cresol, xylenol and halogenated derivatives thereof, at a concentration of at least 10 percent by weight.

25. A composition comprising a solution of an aromatic polyimide as claimed in claim 8 homogeneously dissolved in a phenolic solvent selected from the group consisting of phenol, cresol, xylenol and halogenated derivatives thereof, at a concentration of at least 10 percent by weight.

26. A composition comprising a solution of an aromatic polyimide as claimed in claim 9 homogeneously dissolved in a phenolic solvent selected from the group consisting of phenol, cresol, xylenol and halogenated derivatives thereof, at a concentration of at least 10 percent by weight.

27. A composition comprising a solution of an aromatic polyimide as claimed in claim 10 homogeneously dissolved in a phenolic solvent selected from the group consisting of phenol, cresol, xylenol and halogenated derivatives thereof, at a concentration of at least 10 percent by weight.

28. A composition comprising a solution of an aromatic polyimide as claimed in claim 11 homogeneously dissolved in a phenolic solvent selected from the group consisting of phenol, cresol, xylenol and halogenated derivatives thereof, at a concentration of at least 10 percent by weight.

29. A composition comprising a solution of an aromatic polyimide as claimed in claim 12 homogeneously dissolved in a phenolic solvent selected from the group consisting of phenol, cresol, xylenol and halogenated derivatives thereof, at a concentration of at least 10 percent by weight.

30. A composition comprising a solution of an aromatic polyimide as claimed in claim 13 homogeneously dissolved in a phenolic solvent selected from the group consisting of phenol, cresol, xylenol and halogenated derivatives thereof, at a concentration of at least 10 percent by weight.

31. A composition comprising a solution of an aromatic polyimide as claimed in claim 17 homogeneously dissolved in a phenolic solvent selected from the group consisting of phenol, cresol, xylenol and halogenated derivatives thereof, at a concentration of at least 10 percent by weight.

* * * * *

UNITED STATES PATENT OFFICE
CERTIFICATE OF CORRECTION

Patent No. 3,066,709                                         December 4, 1962

Alton G. Bale, Jr., et al.

It is hereby certified that error appears in the above numbered patent requiring correction and that the said Letters Patent should read as corrected below.

Column 1, line 45, for "fed" read -- feed --; column 3, line 7, for "of", first occurrence, read -- on --; column 6, line 62, for "potentiometers" read -- potentiometer --; column 11, line 42, strike out "to".

Signed and sealed this 7th day of May 1963.

(SEAL)
Attest:

ERNEST W. SWIDER
Attesting Officer

DAVID L. LADD
Commissioner of Patents